United States Patent

Uhlmann

[11] Patent Number: 6,092,033
[45] Date of Patent: *Jul. 18, 2000

[54] METHOD AND APPARATUS FOR FUSING MEAN AND COVARIANCE ESTIMATES

[76] Inventor: Jeffrey K. Uhlmann, 6605 Forbush Ct., Alexandria, Va. 22310

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,774

[22] Filed: Apr. 16, 1997

[51] Int. Cl.$^7$ .................................................. G06F 17/60
[52] U.S. Cl. ..................... 702/189; 702/109; 702/191; 702/196; 701/213; 701/214
[58] Field of Search ..................................... 702/189, 196, 702/109; 701/213, 214

[56] References Cited

U.S. PATENT DOCUMENTS

| | | | |
|---|---|---|---|
| 5,321,613 | 6/1994 | Porter et al. | 364/420 |
| 5,627,768 | 5/1997 | Uhlmann et al. | 364/553 |

OTHER PUBLICATIONS

S Utete, Network Management in Decentralized Sensing systems, Oxford University, pp. 1–28, Unknown Month 1994.

Uhlmann et al, Nondivergent Simultaneous Map Building and Localization using Covariance Intersection, Proceedings of SPIE Aerosense Conference 1997, pp. 207–216, Unknown Month.

Uhlmann et al, A Nondivergent Estimation Algorithm in the Presense of Unknown Correlation, Proceedings of 1997 American Control Conference, entire paper, Unknown Month 1997.

Uhlman et al, General Data Fusion for Estimate With Unknown Cross Covariances, Proceedings of the Aerosense SPIE Conference , pp. 536–547, Unknown Month 1996.

Neal Carson, Federated Square Root Filter for Decentralized Parallel Processes, IEEE, 26 May 1990.

Bertsekas and Rhodes "Recussive State Estimation for a Set–Membership Description of Uncertainty" (1971) p.127.

Y. Zhu "Efficient Recussive State Estimation for Dynamic Systems without Knowledge of Noise Covariances" (1999) p.106.

Uhlman et al, A New Approach to Simultaneous Localization and Dynamic Map Building, pp. 26–36, unknown month 1996.

1971 Bertsekas and Rhodes "Recursive State Estimation For A Set–Membership Description Of University" (1971) p. 127.

Y. Zhu "Efficient Recursive State Estimates For Dynamic Systems Without Knowledge Of Noise Convariances" (1999) p. 106.

*Primary Examiner*—John Barlow
*Assistant Examiner*—Linh Nguyen

[57] ABSTRACT

A method and apparatus are described for fusing a plurality of signals, corresponding to mean and covariance estimates, into a single signal when the given signal estimates are correlated to an unknown degree. The core components of the method and apparatus are (1) capability to express the means and covariances of the set of signals in inverse form in a common coordinate frame and (2) capability to form a signal determined by a convex combination of the means and covariances, so expressed. The set of estimates to be fused may comprise previously fused estimates as well as measurements of a physical system. The signal derived from the fused result can be transmitted and used to physically respond to the measured state of the system of interest.

20 Claims, 4 Drawing Sheets

METHOD AND APPARATUS FOR FUSING MEAN AND COVARIANCE ESTIMATES

BACKGROUND OF THE INVENTION

1. Field of the Invention

This invention relates generally to a signal processing method and apparatus for fusing a plurality of signals corresponding to estimates of the state of an object, system, or process. The method and apparatus is specialized or programmed for (1) receiving estimates, each of which can be expressed in the form of a state vector and an error matrix, and (2) transmitting a resulting signal corresponding to an estimate, which can be expressed in the form of a state vector and an error matrix, in order to evoke a physical response from a system receiving the signal.

2. Discussion of Background and Prior Art

The Data Fusion Signal Processing Problem:

The data fusion problem is essentially one of producing a single estimate of the state of an object, system, or process that combines information from multiple estimates related to the state of that object, system, or process. A typical physical example of a data fusion system is a tracking filter that maintains an estimate of the position, speed, and bearing of an autonomous vehicle and must fuse that estimate with estimate signals obtained from physical sensors, which measure quantities related to the state of the vehicle, in order to produce a single improved estimate signal that can be used by a controlling device to precisely steer the vehicle.

A signal herein is defined as any measurable quantity that is related to the changing of the physical state of a process, system, or substance. A signal includes, but is not limited to, radiation produced by a natural or man made process, electrical fluctuations produced by a natural or a man made process, distinctive materials or chemicals produced by a natural or man made process, distinctive structures or configurations of materials produced by a natural or man made process, or distinctive patterns of radiation or electrical activity produced by a natural or a man made process.

Most generally, a signal representing a measurement of any physical system inherently has some degree of random error associated therewith. Thus, the model of any physical system, if it is to accurately account for that random error, must include a way to estimate the expected values and uncertainties in the values of the physical system that occur due to the random error. Some methods assume that the error values have known, relatively small, bounded magnitudes. Unfortunately, such bounds are typically unavailable in practice, so bounded error approaches are not widely applied. More generally, only estimates of the expected error values can be made, as will be discussed subsequently.

The measurement of a signal is provided by a measuring device. A measuring device as defined herein may be, but is not limited to, any physical device that interacts with a physical system and provides information that can be converted into an estimate comprised of a nominal estimate of the state of the system and an estimate of the error associated with that nominal state estimate. A measuring device as defined herein includes any device that emits a signal and measures the change of the signal upon its return, a device that measures a signal that is naturally produced by a physical process, or any device that measures a signal that is produced by a man made process.

Data Fusion For Signals Containing Mean and Covariance Information:

In one of the most common formulations of the data fusion problem, each estimate is represented as, or can be converted to, a pair comprising a state vector (often referred to as the mean) a and an error matrix A, denoted $\{a,A\}$. The state vector a is a (column) vector composed of m elements in which element $a(i)$ corresponds to a variable, such as size or temperature, describing the state of a system of interest. The error matrix A is a matrix having m rows and m columns in which the element $A(i,j)$, for any choice of i and j between 1 and m, is related to the expected value of the product of the errors associated with the values stored in elements $a(i)$ and $a(j)$. If the value of element $A(i,j)$ is precisely the expected value of the product of the errors associated with the values stored in elements $a(i)$ and $a(j)$, for any choice of i and j between 1 and m, then A is referred to as the error covariance of the estimated state vector a.

The error matrix A is often referred to as a covariance matrix according to a general definition of a covariance matrix as being a symmetric matrix with nonnegative eigenvalues, but A is not in general the true error covariance T associated with the state estimate a because T is usually unknown. The standard practice is to choose A large enough that it can be assumed to be of the form $A=T+E$, where E is an unknown covariance matrix representing the overestimated components of A. An overestimated covariance matrix is said to be "conservative" because it suggests that the state estimate is less accurate than it actually is. This is preferred to an underestimated covariance that suggests that the state estimate is more accurate than it actually is. For example, an underestimated covariance could lead a chemical plant operator to believe that the state of a chemical reaction is comfortably within safe operating bounds when in fact the magnitude of the errors in the state estimate are sufficiently large that the true state could easily be outside of the bounds.

The terms mean and covariance sometimes will be used hereafter as abbreviations for state vector and error matrix, respectively, in a manner consistent with colloquial usage in the fields of estimation, filtering, and data fusion.

The data fusion problem for mean and covariance estimates is exemplified by the case of two conservative estimates $\{a,A\}$ and $\{b,B\}$, generated from different sensors, of the state of an autonomous vehicle. In order to steer the vehicle it is necessary to fuse the given estimates into a single estimate to be used by the steering mechanism. A trivial (though apparently never described in the literature) approach for fusing the two estimates would be to produce a fused estimate that consists only of the estimate having the "smaller" covariance matrix, in terms of some measure such as the trace or determinant, and disregard any information contained in the other estimate. In order to avoid having to disregard information from one of the estimates, it is necessary to have a means for generating a fused estimate that combines information from both given estimates and is still guaranteed to be conservative.

The Kalman Filter Update Equation:

The method that is most commonly used for fusing mean and covariance estimates is the Kalman update equation, which is the fundamental component of the well known Kalman filter. The Kalman update equation is known to generate an optimal conservative fused estimate $\{c,C\}$ from given estimates $\{a,A\}$ and $\{b,B\}$ as long as the errors associated with a and b are not correlated. If the errors are correlated, however, then the Kalman estimate is not guaranteed to be conservative. An enhancement to the Kalman update equation has been developed for the case when the exact degree of correlation (defined by a cross covariance matrix) is known, but it cannot be applied in the general case when the degree of correlation is unknown.

A common approach for addressing the problem of fusing correlated estimates is to use the Kalman update equation, knowing that it may yield an underestimated covariance matrix, and then enlarge the resulting covariance matrix by some ad hoc heuristic method so that it can be assumed conservative. Unfortunately, there is no general prior art method for fusing information from two or more conservative estimates to generate an improved estimate that is guaranteed to be conservative. In many problem areas, such as in large decentralized data fusion networks, the problem is most acute because no amount of heuristic tweaking can avoid the limitations of the Kalman update algorithrn. This is of enormous consequence because of the general trend toward decentralization in complex military and industrial systems.

Decentralized Data Fusion Systems:

A decentralized date fusion system is a collection of processing nodes, connected by communication links, in which none of the nodes has knowledge about the overall network topology. Each node performs a specific computing task using information from nodes with which it is linked, but there is no "central" node that controls the network. There are many attractive properties of such decentralized systems, including:

Decentralized systems are reliable in the sense that the loss of a subset of nodes and/or links does not necessarily prevent the rest of the system from functioning. In a centralized system, however, the failure of a common communication manager or of a centralized controller can result in immediate catastrophic failure of the system.

Decentralized systems are flexible in the sense that nodes can be added or deleted by making only local changes to the network. For example, the addition of a node simply involves the establishment of links to one or more nodes in the network. In a centralized system, however, the addition of a new node may change the topology in such a way as to require massive changes to the overall control and communications structure.

The most important class of decentralized networks involves nodes associated with sensors or other information sources. Information from distributed sources propagates through the network so that each node obtains the data relevant to its own processing task. In a battle management application, for example, one node might be associated with the acquisition of information from reconnaissance photos, another with ground-based reports of troop movements, and another with the monitoring of communications transmissions. Information from these nodes might then be transmitted to a node that estimates the position and movement of enemy troops. The information from this node might then be transmitted back to the reconnaissance photo node, which would use the estimated positions of the troops to aid in the automated interpretation of ambiguous features in satellite photos.

The most serious problem arising in decentralized data fusion networks is the effect of correlated (redundant) information. Specifically, pieces of information from multiple sources cannot be combined using the Kalman update algorithm unless they are uncorrelated or have a known degree of correlation. In the battle management example described above, the effect of correlated information can be seen in the following scenario:

1. The photo reconnaissance node transmits information about potentially important features.
2. The troop position estimation node interprets one of the features as possibly being a mobilizing tank battalion at position x. A low confidence hypothesis is then transmitted suggesting that a tank battalion may have mobilized at position x.
3. The information that a tank battalion may have mobilized at position x leads the reconnaissance photo node to interpret the same feature as confirming evidence for the hypothesis. The node then transmits high confidence information that a feature at position x represents a mobilizing tank battalion.
4. The troop position node receives information from the reconnaissance photo node that a mobilizing tank battalion has been identified with high confidence.

The obvious problem is that the two nodes are exchanging redundant pieces of information but are treating them as independent pieces of evidence mounting in support of the hypothesis that a tank battalion has mobilized. A similar situation can arise in a decentralized monitoring system for a chemical process:

1. A reaction vessel is fitted with a variety of sensors including a pressure gauge.
2. Because the bulk temperature of the reaction cannot be measured directly, a node is added that uses pressure information from the pressure node, combined with a model for the reaction, to estimate temperature.
3. A safety monitoring node is added to the system that uses information from the temperature and pressure nodes to determine whether the reaction is proceeding normally.

The added warning node will always be using redundant information from the pressure gauge. Thus if the estimates of pressure and temperature are treated as uncorrelated, then the fact that their relationship is always what is predicted by the model might lead to over confidence in the stability of the system.

Methods for avoiding the potentially disastrous effects of redundant information in decentralized networks has been a significant research area for several years. A devastating blow to the field came from Oxford researcher Simukai Utete who proved that in a general decentralized network it is impossible to avoid the deleterious effects of correlated estimates using the Kalman update algorithm. This proof seemed to pessimistically settle most of the open questions about the usefulness of decentralized estimation systems. However, her proof is based on the Kalman update requirement for strict knowledge of the degrees of correlation among estimates to be fused. If a different data fusion method is used that does not require any assumptions that estimates to be fused are uncorrelated, then the promise of general decentralized estimation can be realized. The present invention represents such a method.

SUMMARY OF THE INVENTION

Summary of Objects:

It is an object of the present invention to provide a method and apparatus for fusing potentially correlated mean and covariance estimates so that the fused mean and covariance estimate tends to be conservative if the estimates to be fused are also conservative.

It is another object of this invention that the resulting fused covariance matrix can be guaranteed to be less than or equal to, according to a particular measure of matrix size, the covariance matrix of any of the input covariances.

And it is also an object of this invention that the size of the resulting fused covariance matrix can be strictly less than the covariance matrix of any of the input estimates. No prior art provides such capabilities.

In accordance with these and other objects made apparent hereinafter, the invention is a method and apparatus for fusing signals, each of which can be represented in the form of, or converted to, a mean vector and covariance matrix, in order to produce a new signal that similarly can be represented in the form of, or converted to, a mean vector and covariance matrix. These and other objects of the invention may be accomplished by a signal processing system comprising:

(1) means for obtaining measurement estimates relating to the state of a physical system and to the error covariance of that measurement;

(2) means for transforming a set of estimates to a common coordinate system;

(3) means for determining (implicitly or explicitly) a weighting factor for each of a plurality of mean and covariance estimates in inverse form such that the sum of the weighting factors is one;

(4) means for computing (implicitly or explicitly) a weighted sum of a plurality of mean and covariance estimates in inverse form and transmitting a signal derived from the sum; and optionally, (5) means for physically responding based on the fused signal.

These and other objects of the invention may also be accomplished by a computer readable memory, coupled with a signal processing system, wherein the memory stores instructions for configuring the signal processing system to perform a method of fusing mean and covariance estimates according to the invention.

The computer readable memory may include, but is not limited to, electromagnetic storage media and optical storage media, and the memory may be read-only or read-writable. Specific examples of computer readable memory capable of storing instructions for configuring a signal processing system according to the method of the invention include, but are not limited to, commercially available computer diskettes and hard disks, CD-ROMS, flash memory, and random access memory chips and cards.

Measurement Estimates and Transformations:

A measuring device typically generates a signal that is related according to known equations or physical laws to the state of a physical system that is measured by the device. By using the equations or physical laws, the signal produced by the measuring device may be converted into quantities representing the values of variables of interest, such as temperature or pressure, relating to the state of the system. The variables of interest can then be indexed so that they can be represented in the form of a vector wherein each element of the vector corresponds to a specific variable. The value for each variable derived from the signal produced by the measuring device can then be associated with an element of the vector corresponding to that variable. It is common for the indices of the vector to correspond to addresses of machine readable memory in which the values can be stored for manipulation by a general purpose computer.

By repeatedly measuring the state of a system whose true state is already known, it is possible to determine the actual errors in the measurements by examining the difference between each measurement vector and the vector corresponding to the true state of the system. Using standard methods, the set of measurement errors can be processed to produce a model for generating an estimated error covariance matrix for any subsequent measurement vector produced from the device. In many cases it is also possible to estimate the error covariance matrix associated with a measurement vector using known equations and physical laws that relate the measuring device and the system being measured. These and other methods for generating mean and covariance estimates from signals produced from measuring devices are well known and widely used to produce inputs for Kalman filters.

In order for a set of estimates to be fused, they must first be transformed to a common coordinate system. Methods for transforming mean and covariance estimates to a common coordinate frame, e.g., from spherical coordinate system to a cartesian coordinate frame, are well known and widely used to produce inputs for Kalman filters. (A very general method for performing such transformations is described in patent application 7170-001-22.) Hereafter it is to be understood that any set of estimates that are to be fused has been, or will be, transformed to a common coordinate frame before the beginning of the fusion process.

Is It is also known that a mean and covariance estimate $\{a,A\}$ can be represented in, or converted to, inverse form $\{\underline{a},\underline{A}\}$ wherein $\underline{A}$ is the matrix inverse of $A$ and $\underline{a}=\underline{A}*a$. This representation is convenient because it is sometimes the case that a measuring device provides no information about a variable of interest, so the uncertainty associated with the element of the measurement vector corresponding to that variable must be infinite. This implies that one or more elements of the measurement covariance matrix must be infinite. Although in practice it is common to approximate an infinite value by a finite value comparable to the largest value that can be represented on a given computer, the inverse form does not require approximations because each infinite value becomes exactly zero in the inverse covariance matrix.

Inverse Form of the Kalman Filter:

Another benefit of the inverse representation is that estimates in inverse form may be combined linearly to produce fused estimates in inverse form. For example, it is known that the standard Kalman update equation can be algebraically transformed into:

$$\underline{C}=\underline{A}+\underline{B},$$

$$\underline{c}=\underline{a}+\underline{b},$$

where $\{\underline{c},\underline{C}\}$ is the inverse form of the fused estimate based on the assumption that the errors associated with a and b are not correlated. It is straightforward to transform from inverse form to obtain $\{c,C\}$ by obtaining $C$ as the matrix inverse of $\underline{C}$ and obtaining $c$ as $c=C*\underline{c}$. In cases where the inverting of $\underline{C}$ implies infinite values in $C$, the standard practice of approximating infinite values with large finite values can be used. Other approaches for generating approximate inverses on finite precision computers include the well known generalized inverse, which is also known as the pseudoinverse and the Moore-Penrose inverse. Hereafter the term "inverse" shall refer to both true and approximate inverses.

If uncorrelatedness is assumed, then it is also possible to fuse m estimates in inverse form simultaneously according to the inverse form of the Kalman update equation:

$$\underline{C}=X1+X2+X3+\ldots+Xm,$$

$$\underline{c}=x1+x2+x3+\ldots+xm.$$

The inverse form of the Kalman update equation is far less commonly used than the standard form because the implementation of the standard form on a computer tends to be much more efficient. However, the inverse form of the Kalman update equation is of theoretical value and provides one of the insights behind the invention.

The inverse form of the Kalman filter can be interpreted as computing a weighted sum of the inverse estimates wherein the weighting factor applied to each estimate is one. Because of the uncorrelatedness assumption, each added estimate provides information that increases $\underline{C}$, thus decreasing its inverse C. If the assumption does not hold, however, then one or more of the estimates may not provide any additional information. For example, if an estimate {a,A} is produced by a measuring device and transmitted redundantly in such a way that two copies of the estimate are received by a Kalman filter, then a fused estimate will be generated from estimates that are completely correlated:

$\underline{C}=\underline{A}+\underline{A}=2*\underline{A}$, $\underline{c}=\underline{a}+\underline{a}=2*\underline{a}$.

Converting the estimate $\{\underline{c},\underline{C}\}$ from inverse form to standard form reveals that $\{c,C\}=\{a,0.5*A\}$. Thus the covariance of the fused estimate is reduced by half even though no information was available beyond the single original measurement. This reduction is due to the inherent assumption in the Kalman update equation that all information is uncorrelated. The fused estimate is therefore not conservative unless A was originally overestimated by a factor of two or more.

The Method of the Invention:

From a set of possibly correlated estimates, all that is known is that each estimate is itself conservative, but there is no obvious method for deriving a fused estimate that is guaranteed to be conservative. Knowing that the inverse estimates can be combined linearly, however, implies that a convex combination of a set of conservative inverse estimates must yield an inverse estimate within the convex hull of the set of inverse estimates. Hypothesizing that the resulting estimate must necessarily be conservative, the idea behind the invention is to replace the implicit weighting factors of one in the inverse Kalman update equation with a set of weighting factors that sum to one, w1 through wm, and computing a fused estimate defined by the following convex combination of estimates:

$\underline{C}=w1*X1+w2*X2+w3*X3+\ldots+wm*Xm$, $\underline{c}=w1*x1+w2*x2+w3*x3+\ldots+wm*xm$.

It has been proven by different authors in peer-reviewed publications that this convex combination of conservative estimates in inverse form will always produce an estimate that is conservative regardless of the choice of values of the weights, so long as they sum to one. Despite the strong skepticism of persons familiar with the data fusion problem suggesting that such a general result is not possible (especially in light of Dr. Utete's results), no counter-examples nor flaws in the proofs have been identified. Although both statistical and convexity proofs have been developed showing that the approach always yields conservative fused estimates, experimental evidence demonstrating that the approach tends to produce conservative fused estimates from correlated (but conservative) estimates implies that the usefulness of the approach is not dependent on the correctness of the proofs.

Returning to the previous example in which the set of estimates to be fused consists of redundant copies of the measurement estimate {a,A}, the estimate resulting from the invention is:

$\underline{C}=w*\underline{A}+(1-w)*\underline{A}=\underline{A}$, $\underline{c}=w*\underline{a}+(1-w)*\underline{a}=\underline{a}$.

wherein the fact that the weights w and (1−w) sum to one causes the fusion of the redundant estimates to correctly produce the original conservative measurement estimate. The estimate produced by the Kalman update equation, as was shown, resulted in an estimate with a spuriously smaller covariance matrix. Note that in general there is no choice of weights according to the invention that yields estimates equivalent to that of the Kalman update equation. However, the method of the invention always can be used in place of the Kalman update equation to ensure that unexpected correlations do not undermine the fusion process.

Choosing the Weighting Factors:

Although the particular choice of weights in the convex combination does not affect whether the resulting estimate is conservative, the choice does affect the size of the resulting covariance matrix, which determines the quality of the estimate. It is therefore preferred that the choice of weights be made so as to minimize some measure of the covariance C of the resulting fused estimate. (The term "minimize" should be read to mean "approximately minimize," where the accuracy of the approximation is determined by limitations of the approach or hardware used in determining the weights.) Assigning a weighting factor of 1.0 to the estimate having the smallest covariance, and 0.0 to all other estimates, is equivalent to the trivial method of selecting the estimate with the smallest covariance to be the fused estimate. However, this choice of weights is not in general optimal according to any standard measure of covariance size.

It is known that many common measures of the size of a convex combination of covariance matrices can be minimized efficiently using linear matrix inequality (LMI) and convex programming techniques. Such measures include, but are not limited to, the weighted Lp norms, trace, determinant, and weighted sum eigenvalues (or logarithms of eigenvalues). Public domain optimization software based on LMI, convex, and semidefinite programming, such as SPDSOL, is widely available that can be used to generate the sets of weights required to minimize these and other measures. The determinant is particularly efficient to minimize because the weights that minimize the determinant det(C) also maximize the determinant det($\underline{C}$) because of the known relationship det(C)=1/det($\underline{C}$). Public domain software such as MAXDET can be used to generate the set of weights to maximize the determinant of $\underline{C}$, therefore minimizing the determinant of C. Standard mathematical optimization methods such as the simplex method and Newton's method can also be applied to generate the set of weights. These methods can be applied in a straightforward manner according to procedures described in texts such as Numerical Recipes in C.

In some applications it is preferred to minimize a sub-block of the covariance matrix of the fused estimate. For example, in a missile tracking application that maintains a state estimate consisting of position, velocity, and temperature of a missile, it may be desirable to determine weighting factors to minimize the sub-block of C representing the covariance of the speed and velocity variables, but not the relatively unimportant temperature variable. Determining weighting factors in this way ensures that the accuracy of the critical position and velocity estimates is not degraded in an (implicit) attempt to maintain an accurate estimate of temperature.

Other covariance measures can also be minimized efficiently, but brute force methods can always be applied to minimize any choice of measure. For example, it is possible to use a pseudo-random number generator to produce a set of pseudo-random numbers, then divide each number by the sum of the set of numbers so that the resulting set sums to one, and then determine the estimate resulting from the use of the set of numbers as weights according to the invention. Repeating the process for a large number of sets of weights and then selecting the set of weights producing the estimate with the smallest covariance, according to the chosen measure, will tend to produce improved estimates as the number of sets is increased. General optimization methods based on simulated annealing and genetic algorithms can also be applied to generate the set of weights when brute force approaches are not practical.

Summary of Invention and Important Note:

Once a set of weights has been determined, the fused estimate in inverse form can be produced according to the invention as a weighted sum (or more specifically, a convex combination) of received estimates in inverse form. The fused estimate then can be transmitted for subsequent signal processing, which could include transformation to non-inverse form, before reaching a steering controller, a display device, a storage device, or back to the invention by way of a feedback loop. If a feedback loop exists, then a given estimate may be fused multiple times with other estimates before ultimately being received by a control device, a display device, or some other physical device that is affected by the signal.

A point that is critical to emphasize is that the invention has been described in mathematical notation that is convenient for understanding and expressing the method. However, it is straightforward for a person versed in the field to transform the data fusion equations of the invention to an alternative, but functionally equivalent, form. For example, it is straightforward to algebraically manipulate the data fusion equations of the invention to a form that might be implemented differently on a computer, but implicitly performs the same method, e.g., in the same way that a method containing a step that computes $x*(y+z)$ would be the same method as one that computes $(x*y+x*z)$ for the step. The inverse form of the Kalman update equation is a perfect example: The inverse form of the Kalman update equation is obtained algebraically from the standard Kalman update equation, but it performs the same method. Other common transformations of filtering methods involve the use of square roots of parameters and matrices in order to enforce positivity constraints and reduce roundoff errors in various calculations. When applied to the Kalman filter, these transformations yield the so-called square root Kalman filter and the inverse square root Kalman filter.

Numerous identities are provided in filtering, control, and matrix analysis texts for reformulating vector and matrix expressions in order to reduce the number of calculations required to evaluate an expression on a computer, to improve the numerical properties of the expression when evaluated on a finite word-length computer, or to facilitate the simultaneous evaluation of components of the expression on multiple computer processors. It is straightforward for someone knowledgeable in the field to apply one or more of these identities and related transformations to the present invention to achieve various specialized improvements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a shows a typical example of a computer readable memory that stores instructions on a magnetic media. FIG. 4b shows a typical example of a computer readable memory that stores instructions on an optical media. And FIG. 4c shows a typical example of a computer readable memory that stores instructions electronically. The computer readable memory media of FIGS. 4a, 4b, and 4c are also capable of storing instructions for controlling a mechanism that is able to physically respond based on a fused estimate.

DETAILED DESCRIPTION OF THE PREFERRED EMBODIMENTS

Figure 1:
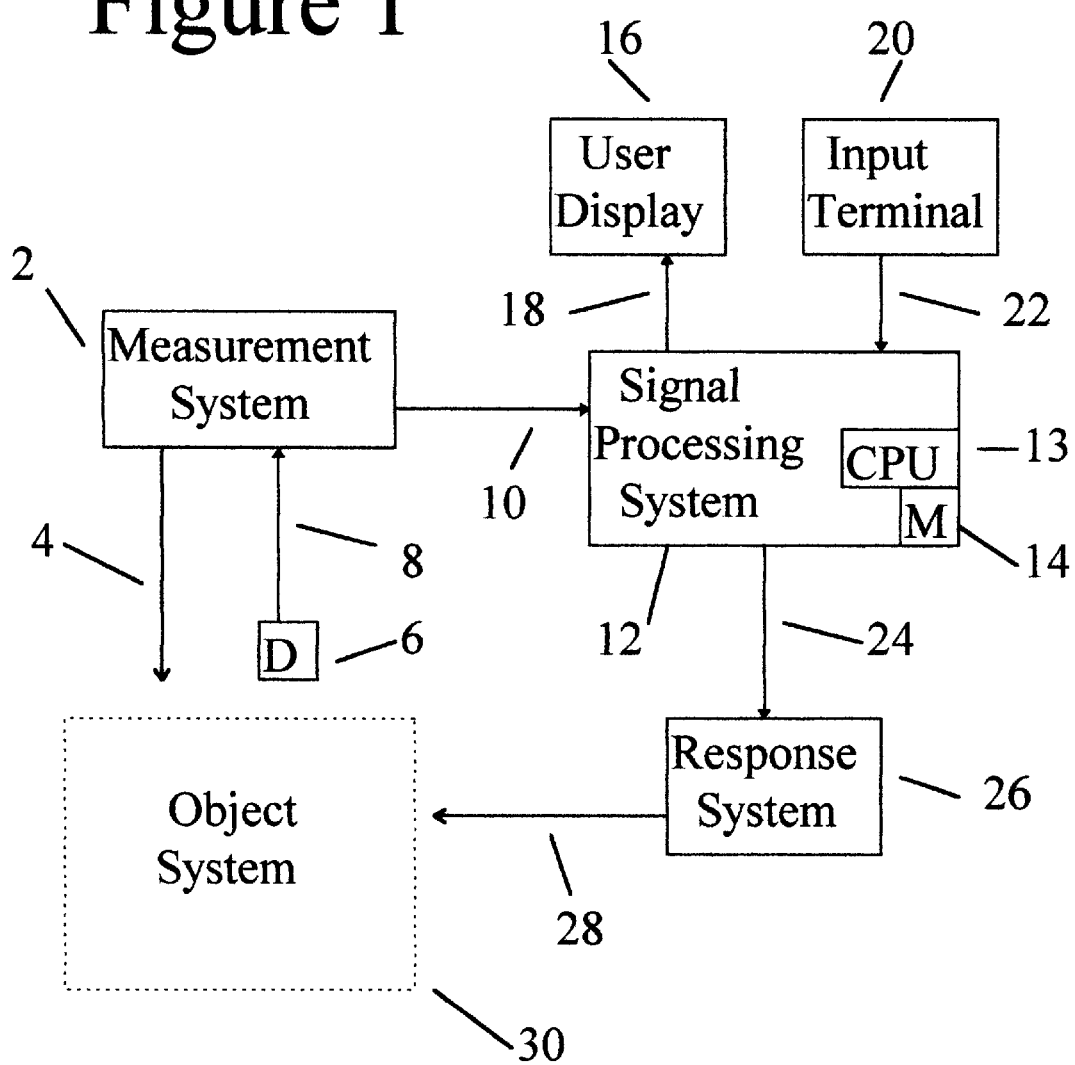
FIG. 1 is a block diagram of a signal processing system programmed or hardwired to perform a signal processing method according to the present invention.

Various other objects, features, and attendant advantages of the present invention will be more fully appreciated as the same becomes better understood from the following detailed description when considered in connection with the accompanying drawings in which like reference characters designate like or corresponding parts, wherein:

FIG. 1 shows a block diagram of an engineering system according to the invention which includes a measurement system 2 for measuring properties of an object system 30. The measurement system 2 includes a probe signal source 4 of probe signals for probing the state of the object system 30. It should be understood that the probe signal source 4 may include multiple remotely located devices, each capable of generating a distinct signal.

A detector 6 detects a signal from the object system 30 that contains information about the state of the object system 30. The detector 6 may include multiple remotely located devices, each of which may be capable of detecting a distinct signal. A connector 8 connects the detector 6 to the measurement system 2 for transmitting a signal corresponding to the signal detected by the detector 6. It should be understood that the connector 8 may include a combination of wires, radio links, and other communications media.

A connector 10 connects the measurement system 2 to a signal processing system 12 for transmitting a signal corresponding to the signal received by the detector 6 to the signal processing system 12. It should be understood that the connector 10, like the connector 8 and all connectors referred to hereafter, may include a combination of wires, radio links, and other communications media.

The signal processing system 12 includes a central processing unit or CPU 13 for performing operations on signals received from the measurement system 2 via the connector 10 in order to process those signals. The CPU 13 may be, but is not restricted to being, a single general purpose computing device such as a microprocessor, a collection of computing devices for parallel processing of information, or an analog computing device. The signal processing system 12 also includes a machine readable memory 14 for storing inter alia the signals received from the measurement system 2, intermediate and final results of processing by the CPU 13, and instructions for controlling the CPU 13. The machine readable memory 14 may consist of a combination of magnetic and optical storage media and may be a combination of read-only and read-writable implementations.

A set of instructions for performing a method of fusing signals, each signal of which can be represented as a mean and covariance or a mean and covariance in inverse form, received via the connector 10, or from the machine readable memory 14 containing previously processed signals, may be stored in the machine readable memory 14. (Flow charts for implementing the method of fusing signals are shown FIG. 2 and FIG. 3.)

A connector 18 connects the signal processing system 12 to a user display 16 for transmitting display data to the user display 16. The user display 16 may be used to display the signals received by the signal processing system 12 from the measurement system 2 and the results of the processing of those signals by the signal processing system 12.

A connector 22 connects an input terminal 20 to the signal processing system 12 for transmitting input data from the input terminal 20 to the signal processing system 12 for exerting control over the operations performed by the signal processing system 12. The input terminal 20 may be a keyboard, mouse, or other device for transmitting information from a human. The input terminal 20 may be used to control and/or reprogram the signal processing system 12 to perform a desired function.

It should be understood that the user display 16 and connector 18, as well as the input terminal 20 and the connector 22, may not necessarily be present during the processing of signals. If the instructions for controlling the signal processing system 12 are created on a remote system and subsequently transferred to the signal processing system 12 via a connector or portable storage media (thus constituting the connector 22), then the remote system represents the input terminal 20. Similarly, if the results of signal processing are subsequently transferred to a remote display via a connector or portable storage media (thus constituting the connector 18), then the remote display represents the user display 16.

A connector 24 connects the signal processing system 12 to a response system 26 for transmitting signals to the response system 26. The response system 26 responds to the signals received from the signal processing system 12 via connector 24 to perform a function that is affected by the state of the object system 30, as that state is determined by the signal processing system 12. The physical response of the response system 26 may affect the state of the object system 30.

When the system envisioned in FIG. 1 corresponds to a missile defense system, the measurement system 2 is a collection of remotely located radar systems, each having a device for producing radar signals, corresponding to part of the signal source 4, and an antenna for receiving radar signals corresponding to part of the detector 6. The region within which missiles may be detected corresponds to the object system 30, and a suite of anti-missile weapons corresponds to the response system 26.

In the missile defense system embodiment of the invention, the signal processing system 12 of FIG. 1 receives mean and covariance measurement estimates via connector 10 that relate to the position of a detected missile. The signal processing system 12 produces a fused mean and covariance estimate from the union of the set of measurement estimates of the position of the detected missile and a set of estimates maintained in machine readable memory 14 generated from previously received measurement estimates. The fused estimate is then transmitted via the connector 24 to the response system 26. The response system 26 responds to the fused estimate by generating a response, corresponding to response 28, consisting of the deployment of an anti-missile weapon in a direction that is determined as a function of the fused mean position estimate.

In an industrial plant embodiment of the invention, the state of a chemical process is measured by a plurality of sensors corresponding to measurement system 2. The signal processing system 12 receives the set of measurement estimates via the connector 10 and fuses them into a single estimate according to the invention. The fused estimate is transmitted via connector 24 to the response system 26 for controlling the process. The response system 26 may, for example, generate a response signal 28 for controlling the rate of reaction in the chemical process. In the event that the response system 26 indicates a dangerous condition, it controls an alarm to indicate that personnel should evacuate areas adjacent to the chemical process.

Figure 2:
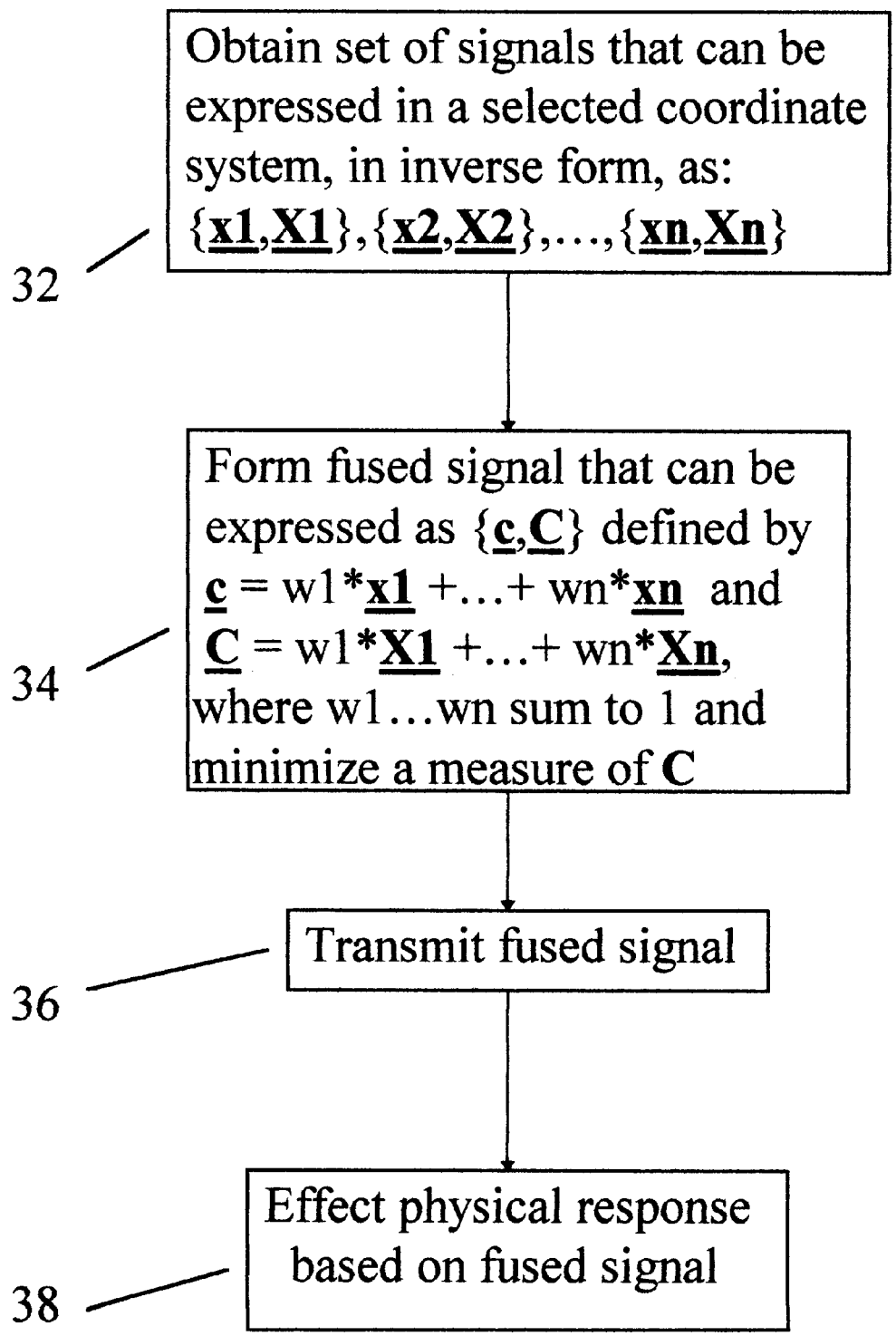
FIG. 2 is a flow chart showing the logical steps that a signal processing system performs when performing the signal processing method according to the present invention.

FIG. 2 is a flow chart showing the logical steps of the method of the present invention. The system of FIG. 1 is a physical apparatus for performing this method. Referring to FIG. 2, Step 32 obtains a set of signals corresponding to mean and covariance estimates determined according to the particular coordinate system selected by the implementor. (A particular signal may be obtained from the output of a measurement system such as measurement system 2 of FIG. 1, or it may be a previously processed signal, e.g., as stored in memory 14 of FIG. 1.) The set of signals could include measurement signals received directly from physical measuring devices, signals encoding estimates of the physical system derived from known physical laws, and signals encoding information resulting from the fusion of previously obtained estimates. Necessarily, one or more of the signals must encode some infonnation derived from measurements of the physical system, and every signal must encode sufficient information to obtain a mean estimate of the state of the physical system and an estimate of the covariance of that estimated state. Each mean and covariance estimate can be expressed in inverse form as described in the Summary of the Invention.

Step 34 forms a fused signal that can be expressed as a convex combination of the estimates, in inverse form, of Step 32. Step 34 may be implemented using any one of various equivalent mathematical formulations of the defined fused estimate on a general purpose computer, parallel processing computer, or analog computer. (A specific implementation of Step 34 is provided in Steps 46, 48, and 50 of FIG. 3.) It is preferred that the formed signal should be formed to minimize a chosen measure of covariance size.

Step 36 transmits the signal to a physical device such as the response system 26 of FIG. 1. The transmitted signal may encode the mean and covariance infonnation by varying the amplitude or frequency of an electronic or electromagnetic energy source. In some cases it is preferred that the transmitted signal only encode the mean vector c, which is a function of both $\underline{c}$ and $\underline{C}$, but not the error matrix C. This is typical when the physical response based on the signal involves pointing a sensor or weapon in a particular direction but makes no use of covariance information.

Step 38 of FIG. 2 effects a physical response based on the signal transmitted in Step 36. For example, the set of physical responses for controlling a sensor may include turning on the sensor, maintaining the current orientation of the sensor, and re-orienting the sensor to maximize the likelihood of detecting a target of interest. If the covariance of the position estimate of a target is large, then it may be advantageous to scan a region around the estimated position such that the size of the region is a function of the size of the covariance. In such a case Step 38 would cause the sensor to perform the scanning operation.

In one embodiment of the method shown in FIG. 2, the set of signals of Step 32 consists precisely of one newly received measurement of the state of the physical system of interest, such as the position and velocity of a vehicle, and one previously transmitted signal representing the current best estimate of the state of the physical system. The fused signal produced in Step 34 then becomes the new current best estimate of the state of the physical system and is transmitted (Step 36) via a feedback loop for the next execution of Step 32 and to a response system capable of producing a physical response (Step 38), such as steering a vehicle, based on the transmitted signal.

In another embodiment of the method shown in FIG. 2, the set of signals obtained in Step 32 are received from nodes in a decentralized data processing network. The fused signal of Step 34 is then transmitted (Step 36) to one or more nodes in the network. The physical response of Step 38 based on the signal of Step 34 may occur after the signal has been subsequently processed by one or more nodes in the network. The physical response in such a system could include the pointing of a sensor in the direction of the fused estimate position.

Figure 3:
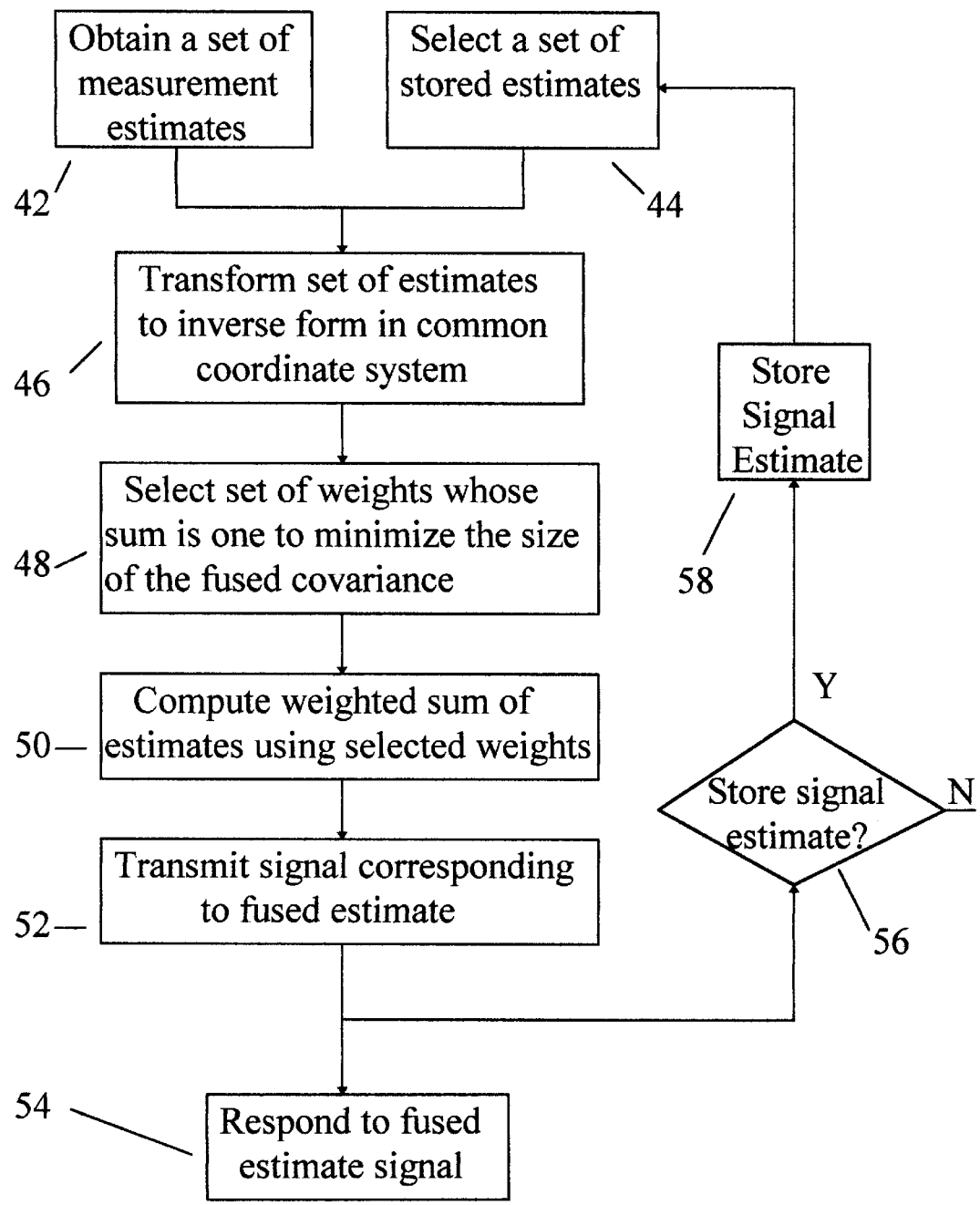
FIG. 3 is a flow chart showing the logical steps of a particular implementation of the signal processing method according to the present invention.

FIG. 3 is a flow chart showing the logical steps for a particular implementation of the method of the present invention. Steps 42 and 44 construct a set of estimates obtained by unioning a set of received measurement estimates and a set of stored estimates derived from previously received measurements. Step 46 effects a transformation of the set of estimates so that they are in a common coordinate frame in inverse form. Step 48 associates a weight factor to each element of the set of estimates such that the weights sum to one. It is preferred that the choice of weight factors results in an estimate that minimizes a chosen measure of covariance size. Step 50 computes a weighted sum of the estimates by summing the vector components of the estimates, each multiplied by its corresponding weight factor, and summing the matrix components of the estimates, each multiplied by its corresponding weight factor.

Step 52 transmits a signal derived from the fused estimate produced in step 50. A typical derived signal is one in standard (non-inverse) mean and covariance form. Step 56 determines whether the transmitted fused estimate signal is stored (step 58) in computer readable memory for possible subsequent processing. Step 54 effects a physical response based on the signal transmitted in step 52.

Figure 4A:
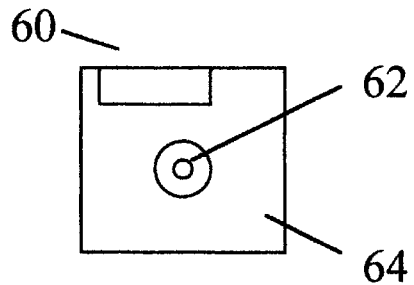
FIGS. 4a, 4b, and 4c show computer readable memory media capable of storing instructions for configuring a computer, coupled with means for obtaining mean and covariance information derived from measurements made by a physical measuring device, to perform a method of the invention.

FIG. 4a shows a particular type of magnetic disk computer readable memory for storing instructions for controlling a computer, coupled with means for obtaining mean and covariance information derived from measurements from physical measuring devices, to form a fused estimate according to a method of the invention. An access slot 60 provides an opening through a disk cover 64 by which a reading device may access the annular disk having a central hole 62 accessible through the disk cover 64.

Figure 4B:
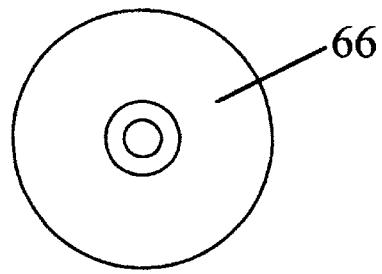

FIG. 4b shows a particular type of optical computer readable memory for storing instructions for controlling a computer, coupled with means for obtaining mean and covariance information derived from measurements from physical measuring devices, to form a fused estimate according to a method of the invention. The optically active surface 66 stores the instructions in a form that can be read by a light emitting reading device such as a laser.

Figure 4C:
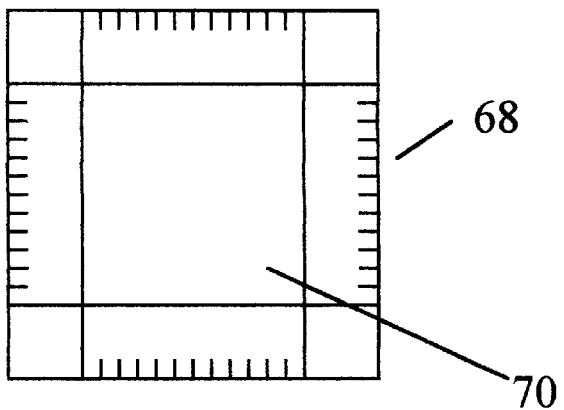

FIG. 4c shows a particular type of electronic computer readable memory for storing instructions for controlling a computer, coupled with means for obtaining mean and covariance information derived from measurements from physical measuring devices, to form a fused estimate according to a method of the invention. The connecting pins 68 provide access to instructions stored in electronic form in a memory board 70.

Bibliography and References:

General information on mean and covariance estimation, and the Kalman update equation in particular, is contained in *Stochastic Processes and Filtering Theory*, by A. H. Jazwinski, Academic Press (1970); *Stochastic Models, Estimation, and Control: Volume I and II*, by P. H. Maybeck, Academic Press (1979,1982); and *Mulitarget-Multisensor Tracking: Principles and Techniques*, by Y. Bar-Shalom and X. Li, YBS Press (1995). The texts of Jazwinski and Maybeck discuss the use of assumed cross covariance matrices in a generalized formulation of the Kalman update equation.

The applications and limitations of the prior art for decentralized data fusion are discussed in *Network Management in Decentralised Sensing Systems*, by Simukai Utete, Oxford University PhD Thesis (1995); and "Data Fusion in Decentralised Networks," by S. Grime and H. Durrant-Whyte, Control Eng. Practice, 2, 1994.

Special-purpose filter methods requiring known bounds on error magnitudes are described in "Bounded-Error Tracking of Time-Varying Parameters," by H. Piet-Lahanier and E. Walter, IEEE Trans. On Automatic Control, 39, 1994; "State Bounding with Ellipsoidal Set Description of Uncertainty," by D. Maksarov and J. Norton, submitted to Int. Journal of Control (1995); and "A New Approach to Simultaneous Localization and Dynamic Map Building," by M. Csorba et al., Proceedings of the 1996 SPIE Aerosense Conference.

Mathematical identities and transformations of equations involving covariance matrices can be found in *Linear Systems*, by T. Kailath, Prentice-Hall (1980); *Matrix Analysis and Topics in Matrix Analysis*, by R. Horn and C. Johnson, Cambridge University Press (1985,1991); in texts on reductions of matrix equations to canonical forms such as *An Introduction to the Theory of Canonical Matrices*, by H. Turnbull and A. Aitken, Dover Publications (1961); and also in the texts by Jazwinski and Maybeck referenced above.

Techniques for optimizing parameters of equations involving covariance matrices can be found in *Numerical Recipes in C*, by Press et al., Cambridge University Press (1988); *Parallel and Distributed Computation*, by D. Bertsekas and J. Tsitsiklis, Prentice-Hall (1989); and various papers by S. Boyd et al. on topics related to their public domain optimization software SPDSOL and MAXDET available at the Stanford University, Electric Engineering Department, web site.

The first publication of the present invention (under the name "Gaussian Intersection") was "General Data Fusion for Estimates with Unknown Cross Covariances," by J. K. Uhlmann in Proceedings of the 1996 SPIE Aerosense Conference. The invention (under the name "Covariance Intersection") is described in the following papers accepted for publication: "Simultaneous Map Building and Localization using Covariance Intersection," by J. K. Uhlmann et al., Proceedings of the 1997 SPIE Aerosense Conference; and "A Non-Divergent Estimation Algorithm in the Presence of Unknown Correlations," by S. Julier and J. K. Uhlmann, Proceedings of the 1997 American Control Conference.

General information on all of the above topics is contained in "Dynamic Map Building and Localization: New Theoretical Foundations," by J. K. Uhlmann, Oxford PhD Thesis, (1995,1996). This thesis was not published until after Nov. 1, 1996.

Additional information on all of the above topics can also be obtained from sources referenced by the above texts and papers. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a fused signal from a set of $n>1$ signals encoding information obtained in part from a physical measuring device, each signal of which relates to an informative estimate of the state of a physical system and an estimate of the error covariance associated with said estimate of the state, comprising:

selecting a global coordinate system within which the estimate of the state of the physical system according to the $k$th signal, for every $k$ between 1 and $n$, has a definable inverse error covariance $\underline{Xk}$;

forming a fused signal which can be represented in the global coordinate system by a vector c and an estimate of the error covariance associated with c, which can be represented as a matrix C defined by;

$\underline{C}=w1*\underline{X1}+w2*\underline{X2}+w3*\underline{X3}+\ldots+wn*\underline{Xn},$ where the set of $n$ positive real valued numbers, $w1\ldots wn$, sum to one and are computed as a function of the error covariances of the $n$ estimates, where c is computed as a function of the $n$ estimates and of the $n$ positive real numbers, and C is the matrix inverse of $\underline{C}$;

transmitting a signal derived from said fused signal.

2. A computer readable memory storing instructions for a configuring a signal processing system, coupled with means for transmitting a signal and with means for obtaining a set of $n\times 1$ signals containing information obtained in part from a physical measuring device, eash signal of which relates to an informative estimate of the state of a physical system and an estimate of the error covariance associated with said estimate, to perform a method for producing a fused estimate comprising:

selecting a global coordinate system within which an estimate relating to the state of the physical system according the the $k$th signal, for every $k$ between 1 and $n$, has a definable inverse error covariance $\underline{Xk}$;

forming a fused signal which can be represented in the global coordinate system by a vector c and an estimate of the error covariance associated with c, which can be represented as a matric C defined by:

$\underline{C}=w1*\underline{X1}+w2*\underline{X2}+w3*\underline{X3}+\ldots+wn*\underline{Xn},$ where the set of $n$ positive real valued numbers, $w1\ldots wn$, sum to one and are computed as a function of the error covariances of the $n$ estimates, where c is computed as a function of the $n$ estimates and of the $n$ positive real numbers, and C is defined as the matrix inverse of $\underline{C}$;

transmitting a signal derived from the fused signal.

3. A specialized or programmed signal processing system for producing a fused signal from a given set of $n>1$ signals encoding information obtained in part from a physical measuring device, each signal of which related to an informative estimate of the state of a physical system and an estimate of the error covariance associated with said estimate of the state, comprising:

means for obtaining the set of $n1$ signals and selecting a global coordinate system within which the estimate of the state of the physical system according to the $k$th signal has a definable inverse covariance $\underline{Xk}$;

means for forming a fused signal which is expressed in the global coordinate system by a vector c and an estimate of the error covariance associated with c, which can be represented as a matrix C defined by:

$\underline{C}=w1*\underline{X1}+w2*\underline{X2}+w3*\underline{X3}+\ldots+wn*\underline{Xn},$ where the set of $n$ positive real valued number, $1\ldots wn$, sum to one and are computed as a function of the error covariances of the $n$ estimates, where c is computed as a function of the $n$ estimates and of the $n$ positive real numbers, and C is the matrix inverse of $\underline{C}$;

transmitting a signal derived from the fused signal.

4. The method of claim 1 wherein the said $n$ positive real valued numbers, $w1\ldots wn$, are selected to produce a fused inverse covariance matrix $\underline{C}$ that is not less than $\underline{Xk}$, for every $k$ between 1 and $n$.

5. The computer readable memory of claim 2 including instructions for determining said $n$ positive real valued numbers, $w1\ldots wn$, to produce a fused inverse covariance matrix $\underline{C}$ that is not less than $\underline{Xk}$, for every $k$ between 1 and $n$.

6. The signal processing system of claim 3 including means for determining said $n$ positive real valued numbers, $w1\ldots wn$, to produce a fused covariance matrix $\underline{C}$ that is not less than $\underline{Xk}$, for every $k$ between 1 and $n$.

7. The method according to claim 1 wherein said $w1\ldots wn$ are determined so that said covariance matrix C, or sub-block thereof, is of minimum size according to a chosen measure.

8. The method according to claim 7 wherein said measure is one element of the set of measures that includes determinant, weighted Lp norms, and weighted sum of eigenvalues (or thei logarithms).

9. The method according to claim 1 wherein said $w1\ldots wn$ are determined so that said $\underline{C}$, or sub-block thereof, is of maximum size according to a chosen measure.

10. The method according to claim 1 wherein multiple sets of values for said $w1\ldots wn$ are examined, and the set of values producing, according to a chosen measure, the smallest covariance matrix C, or sub-block thereof, of producing the largest inverse covariance $\underline{C}$, or sub-block thereof, defines the said $1\ldots wn$.

11. The computer readable memory of claim 2 wherein said $w1\ldots wn$ are determined by stored instructions so that said covariance matrix C, or sub-block thereof, is of minimum size according to a chosen measure.

12. The computer readable memory of claim 11 wherein said measure is one element of the set of measures that includes determinant, weighted Lp norms, and weighted sum of eigenvalues (or their logarithms).

13. The computer readable memory according to claim 2 wherein said $w1\ldots wn$ are determined by stored instructions so that said $\underline{C}$, or sub-block thereof, is of maximum size according to a chosen measure.

14. The computer readable memory of claim 2 wherein instructions are stored for examining multiple sets of values for said $w1\ldots wn$, and the set of values producing, according to a chosen measure, the smallest covariance matrix C, or sub-block thereof, or producing the largest inverse covariance $\underline{C}$, or sub-block thereof, defines the said $w1\ldots wn$.

15. The signal processing system of claim 3 including means for determining said $w1\ldots wn$ so that said covariance matrix C, or sub-block thereof, is of minimum size according to a chosen measure.

16. The signal processing system of claim 15 wherein said measure is one element of the set of measures that includes determinant, weighted Lp norms, and weighted sum of eigenvalues (or their logarithms).

17. The signal processing system of claim 3 including means for determining said $w1 \ldots wn$ so that said $\underline{C}$, or sub-block thereof, is of maximum size according to a chosen measure.

18. The signal processing system of claim 3 including means for examining multiple sets of values for said $w1 \ldots wn$ and for selecting the set of values producing, according to a chosen measure, the smallest covariance matrix C, or sub-block thereof, or producing the largest inverse covariance $\underline{C}$, or sub-block thereof, to be the said $w1 \ldots wn$.

19. The method according to claim 10 wherein the said physical system relates to one element of the set that includes an autonomous vehicle, an industrial plant, and the state of a system estimated in a node of a decentralized data fusion network.

20. The signal processing system of claim 18 wherein the said estimates relate to one element of the set that includes the state of an autonomous vehicle, the state of an industrial plant, and the state of a system estimated in a node of a decentralized data fusion network.

* * * * *